(12) United States Patent
Long et al.

(10) Patent No.: US 9,794,746 B2
(45) Date of Patent: Oct. 17, 2017

(54) DYNAMIC CONTENT PRESENTATION BASED ON PROXIMITY AND USER DATA

(71) Applicant: Apple Inc., Cupertino, CA (US)

(72) Inventors: Evan G. Long, Palo Alto, CA (US); Ronald D. Lue-Sang, Union City, CA (US)

(73) Assignee: Apple Inc., Cupertino, CA (US)

( * ) Notice: Subject to any disclaimer, the term of this patent is extended or adjusted under 35 U.S.C. 154(b) by 10 days.

(21) Appl. No.: 14/562,271

(22) Filed: Dec. 5, 2014

(65) Prior Publication Data

US 2016/0165395 A1    Jun. 9, 2016

(51) Int. Cl.
*H04W 4/02* (2009.01)
*G06Q 30/02* (2012.01)

(52) U.S. Cl.
CPC ........ *H04W 4/023* (2013.01); *G06Q 30/0269* (2013.01)

(58) Field of Classification Search
None
See application file for complete search history.

(56) References Cited

U.S. PATENT DOCUMENTS

| | | | |
|---|---|---|---|
| 6,484,148 B1 | 11/2002 | Boyd | |
| 6,530,083 B1 * | 3/2003 | Liebenow | H04N 7/163 348/E7.061 |
| 8,180,332 B2 | 5/2012 | Ramer et al. | |
| 8,239,386 B2 | 8/2012 | Bahlmann et al. | |
| 8,645,993 B2 | 2/2014 | Perry | |
| 2003/0222134 A1 | 12/2003 | Boyd | |
| 2005/0071328 A1 * | 3/2005 | Lawrence | G06F 17/3053 |
| 2006/0095516 A1 * | 5/2006 | Wijeratne | G06Q 30/02 709/205 |
| 2008/0077502 A1 | 3/2008 | Boyd | |
| 2008/0120182 A1 * | 5/2008 | Arnold | G06Q 30/0225 705/14.26 |
| 2008/0248740 A1 | 10/2008 | Lazovsky et al. | |
| 2009/0101706 A1 | 4/2009 | Boyd | |
| 2009/0187939 A1 * | 7/2009 | Lajoie | G06Q 30/02 725/34 |
| 2009/0312854 A1 * | 12/2009 | Jung | G03B 21/00 700/90 |
| 2010/0078475 A1 * | 4/2010 | Lin | B64F 1/366 235/380 |
| 2010/0082491 A1 * | 4/2010 | Rosenblatt | G06Q 10/02 705/65 |
| 2011/0143779 A1 * | 6/2011 | Rowe | G06Q 30/02 455/456.3 |
| 2013/0290419 A1 | 10/2013 | Spencer et al. | |
| 2014/0006451 A1 * | 1/2014 | Mullis | G06Q 20/18 707/784 |
| 2014/0078054 A1 * | 3/2014 | Gardenfors et al. | G06F 3/14 345/157 |
| 2014/0149533 A1 * | 5/2014 | Bergman | H04L 67/2842 709/213 |
| 2014/0331189 A1 * | 11/2014 | Lee | G06F 3/04883 715/863 |

* cited by examiner

*Primary Examiner* — Daniel Lai
(74) *Attorney, Agent, or Firm* — Fish & Richardson P.C.

(57) ABSTRACT

A dynamic content presentation system is disclosed that dynamically selects, formats and presents content based on data received from mobile devices in physical proximity to the dynamic content presentation system.

20 Claims, 5 Drawing Sheets

DYNAMIC CONTENT PRESENTATION BASED ON PROXIMITY AND USER DATA

TECHNICAL FIELD

This disclosure relates generally to radio frequency (RF) beacon technology and location-based services.

BACKGROUND

Content presentation systems, such as computer monitors and television screens, are often deployed in public locations to display important content to the public. Because of size and location constraints, there is a limit to how much content can be displayed and how tailored the content can be to a specific audience. Content providers typically generate or select content for presentation that is sufficiently "generic" to be of interest to most potential users. In some cases, "generic" content such as text is presented in a static or unchanging format (e.g., presented in a single language and font style), which may be difficult to read by some users who do not speak the language or are visually impaired.

SUMMARY

A dynamic content presentation system is disclosed that dynamically selects, formats and presents content based on data received from mobile devices in physical proximity to the dynamic content presentation system.

In some implementations, a method comprises: receiving, by a wireless interface of the dynamic content presentation system, data from mobile devices in physical proximity to the dynamic content presentation system; selecting, by the one or more hardware processors, content for presentation based on the data, the selecting including determining the content for presentation based on one or more user preferences indicated by data received from a subset of the mobile devices; formatting, by the one or more hardware processors, the selected content for presentation based on the data; and presenting, by an output device of the dynamic content presentation system, the formatted content.

In some implementations, an apparatus comprises: an output device configured for presenting content; a wireless interface configured to receive data from mobile devices in physical proximity to the apparatus; one or more processors coupled to the output device and the wireless interface, the one or more processors configured to: receive, by the wireless interface, data from mobile devices; select, by the one or more hardware processors, content for presentation based on the data, the selecting including determining the content for presentation based on one or more user preferences indicated by data received from a subset of the mobile devices; format, by the one or more hardware processors, the selected content for presentation based on the data; and present, by the output device, the formatted content.

In some implementations, a system comprises: mobile devices; and a dynamic content presentation system including: an output device configured for presenting content; a wireless interface configured to receive data from the mobile devices; one or more hardware processors; and memory storing instructions, which, when executed by the one or more processors, causes the one or more processors to perform operations comprising: receiving, by the wireless interface, data from the mobile devices that are in physical proximity to the dynamic content presentation system; selecting, by the one or more hardware processors, content for presentation based on the data, the selecting including determining the content for presentation based on one or more user preferences indicated by data received from a subset of the mobile devices; formatting, by the one or more hardware processors, the selected content for presentation based on the data; and presenting, by the output device, the formatted content.

Particular implementations disclosed herein provide one or more of the following advantages. The disclosed dynamic content presentation system allows users of the mobile devices in proximity to the dynamic content presentation system to receive content that is dynamically selected based on one or more user preferences indicated by anonymous data received from a subset (e.g., a majority) of the mobile devices. Additionally, a display device and/or audio output shared by users in proximity to the dynamic content presentation system can be formatted according to the one or more preferences.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example Operating Environment

Figure 1:
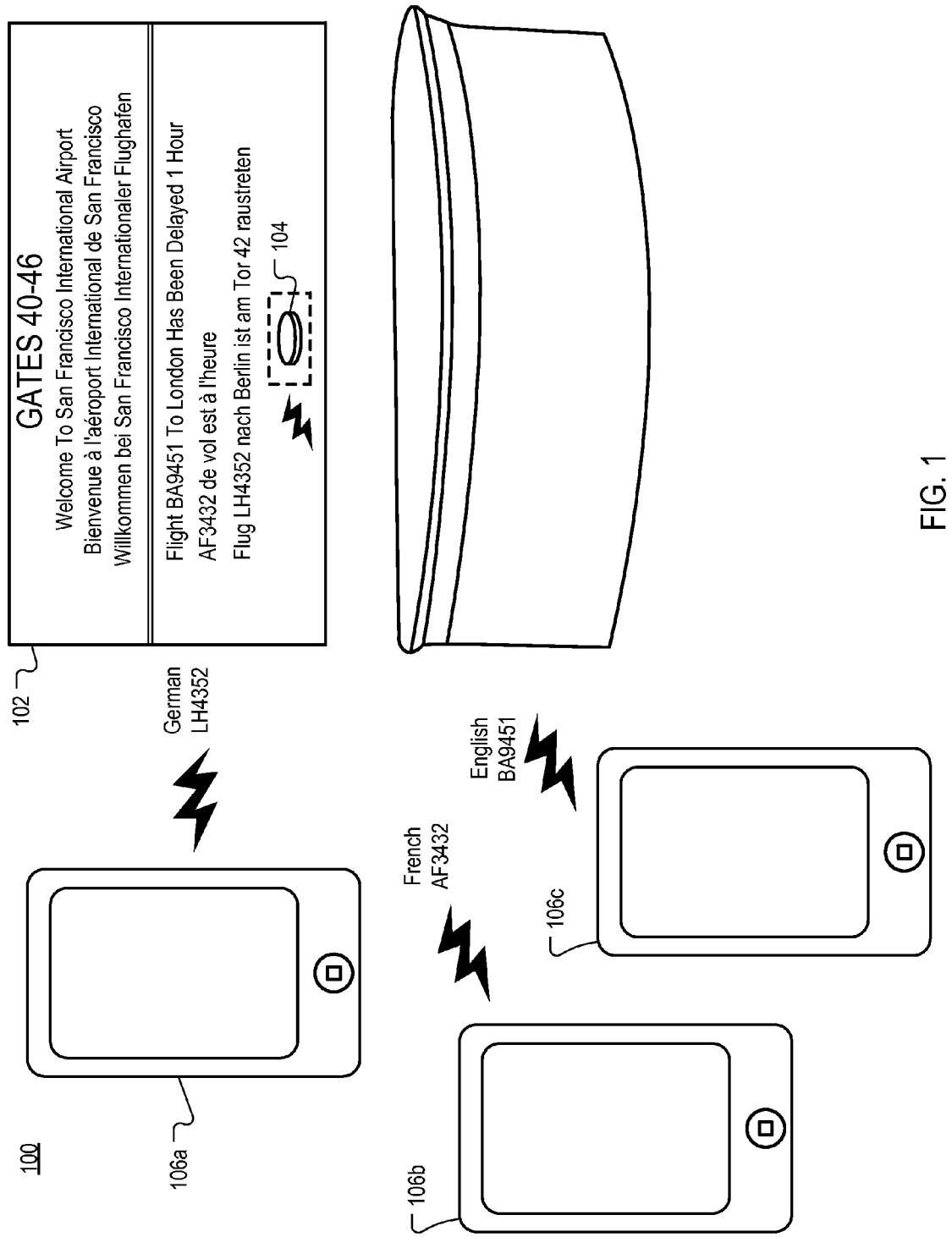
FIG. 1 illustrates an operating environment for dynamic content presentation based on proximity and user data according to some implementations.

FIG. 1 illustrates an operating environment 100 for dynamically presenting content based on proximity and user data. In some implementations, environment 100 can include dynamic content presentation system 102, RF beacon 104 and mobile devices 106*a*-106*c*. In the example shown mobile devices 106*a*-106*c* are operated by users (e.g., passengers) in physical proximity to dynamic content presentation system 102, which in this example, is an airport kiosk with a display for showing flight information. Mobile devices 106*a*-106*c* can include but are not limited to smart phones, tablet computers, wearable computers and laptops.

Mobile device 106*a* is configured to present content in German, mobile device 106*b* is configured to present content in French and mobile device 106*c* is configured to present content in English. Content can include, for example, text and audio. For example, a user of mobile device 106*a* may have set mobile device 106*a* to the German language so that user interfaces and audio are presented in German. Although three mobile devices are shown in FIG. 1, more than three mobile devices can be in proximity to the dynamic content presentation system 102 at the same time and multiple mobile devices can be set to the same language.

In one example scenario, RF beacon 104 (e.g., a BTLE beacon) can broadcast an RF signal with a payload containing a message that invites users of mobile devices 106a-106c to interact with dynamic content presentation system 102. In other scenarios, mobile devices 106a-106c can run an application that can broadcast an RF signal that can be detected by dynamic content presentation system 102. The RF signal can include a request to establish communication with dynamic content presentation system 102. RF beacon 104 can be physically located near dynamic content presentation system 102 and integrated with or communicatively coupled to dynamic content presentation system 102. In some implementations, beacon 104 can be programmed with a specified transmit power that is of sufficient strength to cover a desired geographic area around dynamic content presentation system 102.

After communication between mobile devices 106a-106c is established with dynamic content presentation system 102, mobile devices 106a-106c can transmit anonymous data to dynamic content presentation system 102. In the example shown, mobile devices 106a-106c each transmit information to content presentation system 102, indicating user preferences for language and accessibility and flight information (e.g., a flight number). The user can select language for their mobile device using a settings pane or menu displayed by an operating system or application of the mobile device. The term "anonymous data" as used in the above context means data that does not identify or cannot be used to identify the user.

In some implementations, the flight information can be obtained from an application running on the mobile device (e.g., a flight tracker application). The user can download the flight tracker application from a content source by way of a wireless access point (AP). In some implementations, RF beacon 104 can provide information regarding the availability of a flight tracker application so that mobile devices 106a-106c can "discover" and download the flight tracker application from a network-based content source (e.g., a Website).

In some implementations, flight information (e.g., boarding passes) can be obtained from a digital "passbook" or application that stores airline ticket information. An example application is "Passbook," which is an application included in the iOS® operating system for iPhone® and iPad®, developed and distributed by Apple Inc., Cupertino, Calif. U.S.A. Passbook is time and location enabled, so passes can be configured to display on the user's Lock Screen at the appropriate time and place, such as when the user reaches the airport. Each time the user wakes their device, Passbook checks the relevance of passes and any that are currently relevant are displayed on the Lock Screen.

In the example scenario shown, mobile device 106a transmits the data <German, LH4352>, indicating that mobile device 106a is set for the German language and the user is taking Lufthansa® flight LH4352 to Berlin, Germany. Mobile device 106b transmits the data <French, AF3432>, indicating that mobile device 106b is set for the French language and the user is taking Air France® flight AF3432 to Paris, France. Mobile device 106c transmits the data <English, BA9451>, indicating that mobile device 106c is set for the English language and the user is taking British Airways® flight BA9451 to London, England. When the data are received by dynamic content presentation system 102, dynamic content presentation system 102 selects visual content to be displayed on a display device (e.g., an LCD screen) and/or audio content to be played by an audio system (e.g., audio amplifier and loudspeaker). In this example, the content can be flight information, such as departure times, delays, gate assignments or any other flight information that may be of interest to airline passengers. The content is selected based on user preferences indicated by the data. The selected content is determined based on one or more user preferences indicated by the data provided by a subset (e.g., a majority) of the mobile devices in proximity to dynamic content presentation system 102.

After the content is selected it can be formatted based on the data for presentation on a display device (e.g., LCD screen, television screen) and/or played back on an audio system over a loudspeaker (or through headphones available at the kiosk). In the example shown, dynamic content presentation system 102 is associated with Gates 40-46 in the International Terminal of San Francisco International Airport (SFO). A welcome message "Welcome to San Francisco International Airport" is displayed in English, French and German as well as flight information for flights BA9451, AF3432 and LH4352. For example, the flight information indicates that flight BA9451 to London is delayed 1 hour, flight AF3432 is on time and flight LH4352 is currently boarding at Gate 42.

To summarize the example airport scenario described above, three users operating mobile devices collected around a kiosk for Gates 40-46 at San Francisco International Airport. The mobile devices transmitted language settings and flight information to the dynamic content presentation system (a kiosk) and the dynamic content presentation system used that information to dynamically select, format and present content by an output device, such as a large LCD display and/or audio system. In some implementations, there can be more than three mobile devices in physical proximity to the content presentation system and multiple mobile devices can be configured for the same language and/or store the same flight information. A mobile device is considered to be "in physical proximity to" a dynamic content presentation system when it is in communication range of the dynamic content presentation system.

In some scenarios, there may be too many different languages and/or flight information associated with mobile devices that are in physical proximity to the content presentation system to be presented at one time on a display device or audio system. In such scenarios, the dynamic content presentation system can use a "voting" process to select content for presentation to users of the mobile devices, where each user receives one vote even if the user has more than one mobile device within proximity of the dynamic content presentation system. For example, if the user has in their possession a smart phone and a tablet computer, the user would only get one vote in the voting process. If in the "voting" process a percentage (e.g., a majority) of the users that are in physical proximity to the dynamic content presentation system provide the same data (e.g., the same flight number), then content related to that common data can be selected by the dynamic content presentation system.

In some cases, the top two or three languages and/or flight numbers based on a percentage of the total voting users can be selected for presentation. The percentage can be periodically recalculated on a scheduled basis (e.g., recalculated every 5 minutes) or in response to a trigger event, such as when a voting user moves outside the communication range of the dynamic content presentation system, the maximum dwell time period during which the user can "cast" a vote expires (as described below) or when the language or flight information changes.

In some implementations, anonymous mobile device data is included in the voting process only if the mobile device is in physical proximity to the content presentation system for a specified minimum dwell time (e.g., 1 minute). This prevents data transmitted by transitory devices from being used in the voting process. For example, a user passing the kiosk on the way to another destination will not have their data used in the percentage calculation. In some implementations, the user may be prompted to reply to a message sent by the kiosk inviting the user to participate, which if responded to by the user would allow the data transmitted from the user's device to be included in the percentage calculation. In some implementations, if the dwell time exceeds a maximum dwell time (e.g., 10 minutes) the user can be excluded from the voting process. For example, the user may be sitting near the kiosk for an hour waiting to board a plane and not interested in or have a preference regarding the content presented by the dynamic content presentation system.

In the example scenario described above, the data transmitted by the mobile devices includes language preference and flight information. Other information could also be included in the data, such as an accessibility preference. The accessibility preference can be used to format a visual presentation on a display device by changing a default font size and/or font type of text so it is more "readable" by a vision impaired user. In some implementations, selected visual content can be broadcast by the content presentation system so that it can be received by mobile devices and displayed according to the accessibility preference of the user of the mobile device. The accessibility preference can also trigger the audio presentation of content in place of or in addition to the presentation of visual content.

In some implementations, the content presentation system can broadcast an audio file of selected content so that it can be played back through a loudspeaker or headphone jack of the mobile device rather than through a loudspeaker or headphones of the content presentation system. This can be implemented using a unique and anonymous identifier, as described in further detail below.

The example airport scenario described above is one example application for dynamic content presentation based on proximity and mobile device data. The disclosed technology, however, is applicable to any scenario where one or more mobile devices are in physical proximity to a dynamic content presentation system. For example, the technology is applicable to any transportation mode, such as trains, buses and boats. In some implementations, an electronic billboard can display personalized content based on data transmitted by mobile devices in proximity to the electronic billboard. For example, the language of text displayed on the electronic billboard can change according to the language and/or accessibility preferences information provided by a subset of voting mobile devices.

In some implementations, personal computers, shopping mall kiosks, television systems/appliances or "infotainment" systems can be automatically configured to present selected content in an appropriate language and accessibility format based on data provided by a subset of voting mobile devices. For example, a television system embedded in the back of a passenger seat of a car, bus or plane can automatically select, format and present content in a language and accessibility format that is preferred by a passenger seated behind the passenger seat.

In retail stores, museums, elevators or other public locations, audio systems can broadcast information and/or content (e.g., advertisements) in one or more languages based on data received from the mobile devices of a subset of voting users. In some implementations, the mobile devices can transmit music or video preferences to an audio or video system (e.g., playlists), which can be used by the audio or video system to generate a playlist that is personalized to a majority (>50%) of users that are operating their mobile devices in physical proximity to the audio or video system. For example, if a majority of voting mobile devices transmit data indicating user preferences for Rock 'n Roll music the audio system can generate a playlist that includes Rock 'n Roll music. Such an audio system could assist or replace a Disc Jockey or Juke Box at a party or other event.

Example Content Presentation System

Figure 2:
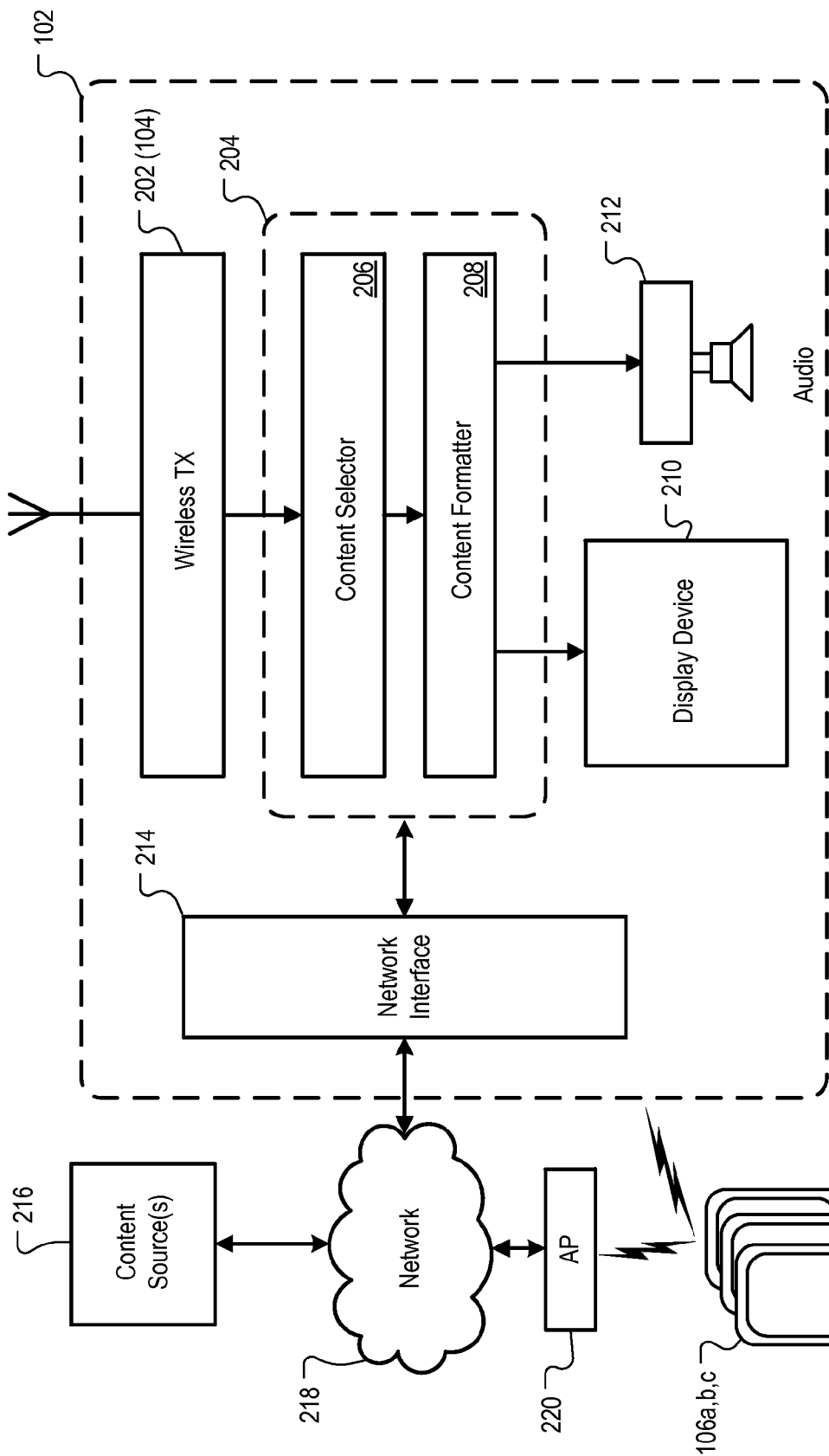
FIG. 2 is a block diagram of a dynamic content presentation system according to some implementations.

FIG. 2 is a block diagram of an example dynamic content presentation system 102. In some implementations, dynamic content presentation system 102 can include wireless transceiver (TX) 202 (e.g., RF beacon 104), processor 204 (e.g., a microprocessor), display device 210 (e.g., LCD screen), audio system 212 (e.g., audio amplifier and loudspeaker) and network interface 214. Content presentation system 102 can couple to network 218 (e.g., Internet, LAN) through network interface 214. Mobile devices 106a-106c can communicate with content presentation system 102 through wireless AP 220 (e.g., WiFi router) and network 218. One or more content sources 216 can communicate with content presentation system 102 through network 218 and network interface 214 using known communication protocols (e.g., HTTP, TCP/IP).

As described in reference to FIG. 1, when in physical proximity to content presentation system 102, mobile devices 106a-106c transmit data, which can be received by wireless TX 202. In some implementations, content presentation system 102 broadcasts a message to mobile devices 106a-106c, inviting the users of the mobile devices to communicate with content presentation system 102. In other implementations, an application running on the mobile devices can detect an RF signal from content presentation system 102 and select data to transmit to content presentation system 102.

In some implementations, the operating system of a mobile device generates and displays a message on a display of the mobile device inviting the user to use the content presentation system. A unique anonymous user identifier can be generated on the mobile device using, for example, a one-way hash on data set associated with the mobile device, such as: Service Set Identification (SSID)+time+location, where mobile device location can be provided by network 218 or a satellite positioning system receiver (e.g., GPS receiver) of the mobile device and time can be taken from a mobile device clock source. The time and location can be coarse measurements. The data can be transmitted to content presentation system 102 over a secure wireless communications channel (e.g., encrypted using WPA, WPA2) to prevent man-in-the-middle attacks and data harvesting of information.

Using the one-way hash described above, each mobile device controlled by a single user can simultaneously generate the same hash when the user's mobile devices are in the same location. In some implementations, the SSID is not a publicly known user identifier, but a secret token only the user knows, hereinafter referred to as "private token." In some implementations, the private token can be generated by a server computer and stored in remote database that is operated by a trusted third party. When a user authenticates, the private token is downloaded and saved to the mobile device for future use. In this case, the trusted third party and the user know the contents of the private token.

In some implementations, the private token can be generated by the user on their mobile device and saved to a "keychain" managed by a password management system. The other mobile devices in control of the user could discover the private token, which can be encrypted in the keychain.

In some implementations, since the user's mobile devices are within close proximity of each other, one of the user's mobile devices can generate a shared private token on demand and share it with the other mobile device over a short range communication link (e.g., Bluetooth, WiFi) prior to voting. When the opportunity to vote arises, the user's mobile devices can agree upon which mobile device will cast the vote to the dynamic content presentation system. In this implementation, the voting mobile device can use a unique token that is generated on demand on the voting mobile device and deleted from the voting mobile device after an expiration time.

In some implementations, the hash that is used in the voting process to anonymously identify a user can be created from the following possible sets of inputs: <private token+time> or <private token+time+location>. Accordingly, the hash is generated with the private token in addition to some other information like current time or location. This results in the hash changing periodically. Since time and/or location are being hashed with the private token, the hash changes in a way that is unpredictable to anyone but the user with the private token. If, in the kiosk example above, the dynamic content presentation system receives multiple votes with the same hash it would discard all but one of those votes since the hash is unique to all user's mobile devices and a one vote per user rule is enforced by the dynamic content presentation system.

The data transmitted by mobile devices 106a-106c can be any anonymous data that can be used to select content for presentation. In the airport kiosk example, the data included language and accessibility preferences (e.g., font sizes) and flight information. Other data could include personal user preferences such as music playlists. The data sent can be requested by content presentation system 102. The data can be received in encrypted data packets that are decrypted and parsed by wireless TX 202 to recover the data. The data are sent to content selector 206, which selects content for presentation on display device 210 and/or audio system 212 based on the data and the voting process described herein. In some implementations, content selector 206 is implemented by software instructions on a computer-readable non-transitory storage medium (e.g., memory) and executed by processor 204.

As previously described herein, data received from mobile devices 106a-106c can be used in a voting process, where each user has one vote regardless of the number of mobile devices in the user's possession. For example, if there are ten voting users in physical proximity to dynamic content presentation system 102 and eight of the voting users provide the same flight information, then dynamic content selector 206 would select content associated with the common flight information for presentation to the voting users.

In some implementations, content is provided by content source(s) 216 through network 218 and stored in, for example, local memory of mobile devices 106a-106c. In the airport kiosk example, content source 216 can be, for example, the flight information display system (FIDS) for San Francisco International Airport (SFO). Content sources 216 can be any network-based server computer accessible through a local or wide area network (e.g., the Internet), including websites and data feeds. Content maybe also be provided locally by computer hard drives, discs or other storage devices.

In some implementations, the data collected from mobile devices 106a-106c can be used to target advertising content to users in physical proximity to content presentation system 102. For example, an electronic billboard can determine the preferences of users operating their mobile devices in physical proximity to the electronic billboard and select advertising content based on the preferences of a majority of the voting users, as determined by the data received from their mobile devices.

After content selector 206 selects the content, content formatter 208 will format the content for presentation on display device 210 and/or audio system 212. Content formatter 208 can be implemented by computer-readable instructions that are executed by processor 204 to perform content formatting operations. Content formatting can include, for example, converting the content into the appropriate language(s) and adjusting the fonts to allow accessibility for vision impaired users (e.g., increase font size).

In some implementations, the results of the voting process previously described can determine how content is presented. Using the airport kiosk example, if the eight users speak French and the other two users speak English the content would be presented in French since (presumably) the majority of the users in the voting process prefer that the content be presented in French. Content formatter 208 can also add content, such as colors, symbols and graphics that are associated with the result of the "voting" process. For example, content formatter 208 could use the colors of the French flag and French symbols (e.g., Eiffel Tower) on display device 210 or play French music through audio system 212 to embellish the presentation of the selected content.

Example Processes

Figure 3:
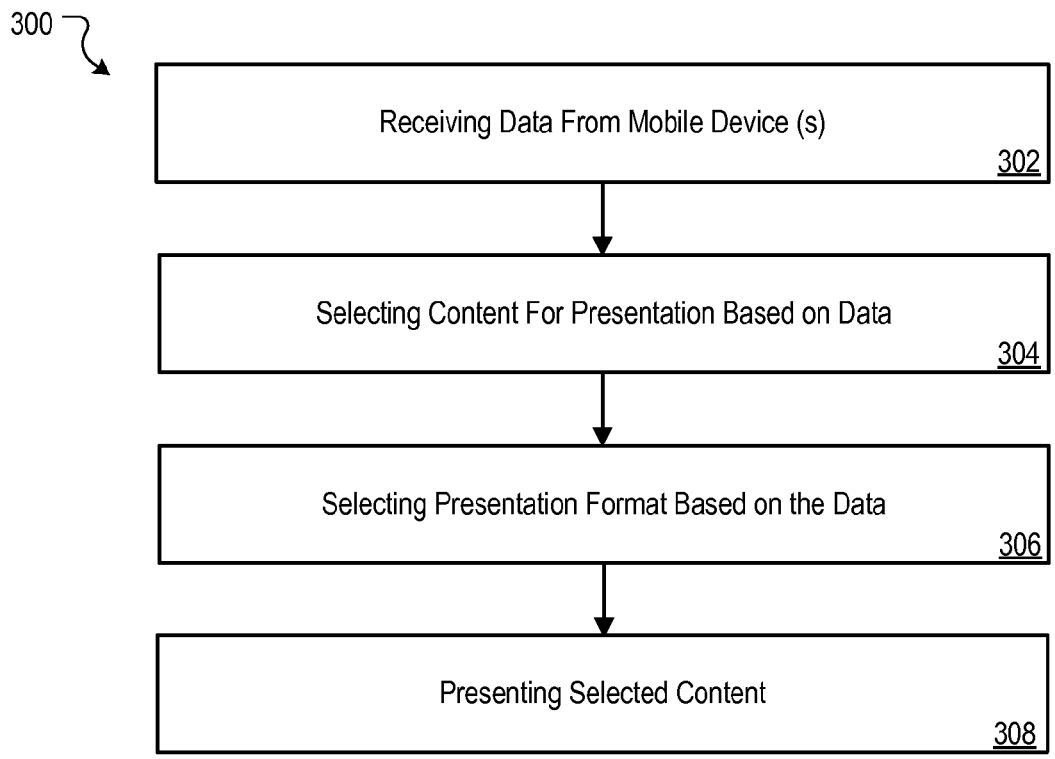
FIG. 3 is a flow diagram of an example process performed by the dynamic content presentation system of FIG. 2 according to some implementations.

FIG. 3 is a flow diagram of a process 300 performed by the dynamic content presentation system of FIG. 2 according to some implementations. Process 300 can be implemented using, for example, the architecture shown in FIG. 6.

In some implementations, process 300 can begin by receiving anonymous data from mobile devices in physical proximity to a dynamic content presentation system (302). For example, an RF beacon (e.g., Bluetooth Low Energy (BTLE) beacon) associated with the dynamic content presentation system can broadcast an RF signal with a message that can be received by the mobile devices. The message can be presented on a display of the mobile device by a mobile device operating system and/or application. The message can invite the user to use the dynamic content presentation system and request specific types of data from the mobile devices. If authorized by the user of the mobile device, the requested data can be encrypted and transmitted to the dynamic content presentation system over a secure wireless communication channel where it can be received and decrypted by a wireless transceiver of the dynamic content presentation system. The anonymous data can be any data that can be used to select content for presentation by the content presentation system but cannot be used to identify.

Process 300 can continue by selecting content for presentation based on data provided by the mobile devices (304). For example, the selecting includes determining the content for presentation based on one or more user preferences indicated by data received from a subset of the mobile devices. The selected content can be acquired from a variety of local and remote (e.g., network-based servers) content sources. After the data is received by the content presentation system, a voting process can be applied to the data to select content for presentation. For example, the voting process can determine if a threshold percentage of users have a preference in a particular content to be presented. In some implementations, content is selected for presentation based on the preferences of a majority (>50%) of the users in physical proximity to the content presentation system. For example, a group of users in physical proximity to an electronic billboard (an example content presentation system) can "opt in" to share their content playlists or libraries with the content presentation system. Each user gets to "cast" one vote even if the user has multiple mobile devices in their possession.

The dynamic content presentation system can apply the voting process to the data that was received from the mobile devices to select or generate dynamically the content for presentation that would appeal to a majority of users. The voting process can add new voting users to the voting process (e.g., when the new users come within communication range of the content presentation system) and exclude existing voting users (e.g., when the existing voting users move outside the communication range of the content presentation system), resulting in a new majority of voting users and potentially different content being selected for presentation. In some implementations, a "vote" can automatically expire after a specified maximum dwell time (e.g., 10 minutes) or in response to a trigger event.

Process 300 can continue by selecting a presentation format (306). For example, the majority of users may have a language preference or an accessibility preference for the presentation of selected content. In some implementations, content preferred by a majority of users can be formatted differently (e.g., formatted for more prominent display) than content preferred by a minority of users.

Process 300 can continue by presenting the selected content (308). A display device (e.g., an LCD screen, television screen) can display the selected visual content and an audio system can play audio content, as described in reference to FIG. 2.

Figure 4:
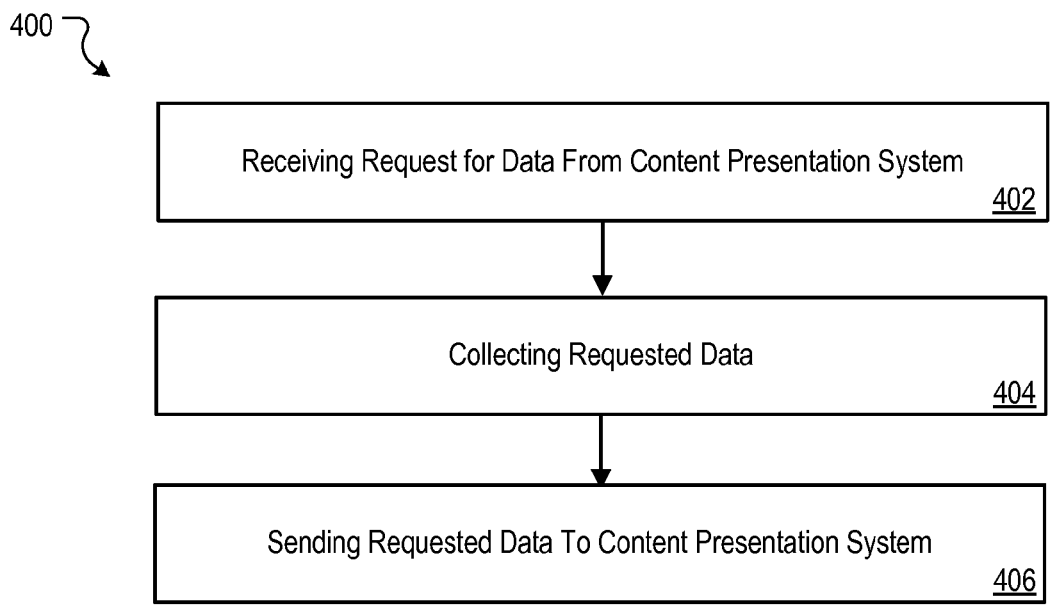
FIG. 4 is a flow diagram of an example process performed by a mobile device according to some implementations.

FIG. 4 is a flow diagram of an example process 400 performed by a mobile device. Process 400 can be implemented using the mobile device architecture described in reference to FIG. 5.

In some implementations, process 400 can begin by receiving a request for anonymous data from a content presentation system (402). For example, a message broadcast from the content presentation system can specify the data so that an application or operating system can collect the data on the mobile device (404) and send the data to the content presentation system (406). In some implementations, the mobile device runs an application that interacts with the content presentation system and provides graphical user interfaces for allowing the user to authorize or "opt in" to interact with the content presentation system. In some implementations, the mobile device encrypts the data before sending it to the content presentation system on a secure wireless communication channel.

In some implementations, a unique and anonymous identifier is generated by the mobile device to facilitate bi-directional communication with the content presentation system, as described in reference to FIG. 2. The unique and anonymous identifier can be used to send personalized content to a mobile device. For example, out of a group of users in physical proximity to the content presentation system, only one may have an accessibility preference. Since this individual would be in the minority in the voting process, the content presentation system could generate personalized content for that user (e.g., text with increased font size) and send it to the user's mobile device using the unique identifier. An application running on the mobile devices can monitor and accept messages broadcast by the content presentation system that are addressed to the mobile device using the unique and anonymous identifier and ignoring messages addressed to other mobile devices. The unique and anonymous identifier can be included in, for example, a data packet header. In some implementations, the unique identifier can be made anonymous using a one-way hash on information that is unique to the mobile device, including an SSID, time and location. Using the one-way hash, potentially user-identifying information remains private and secure, preventing the content presentation system from using the information for other purposes not authorized by the user and defending against a middleman attack.

Example Client Architecture

Figure 5:
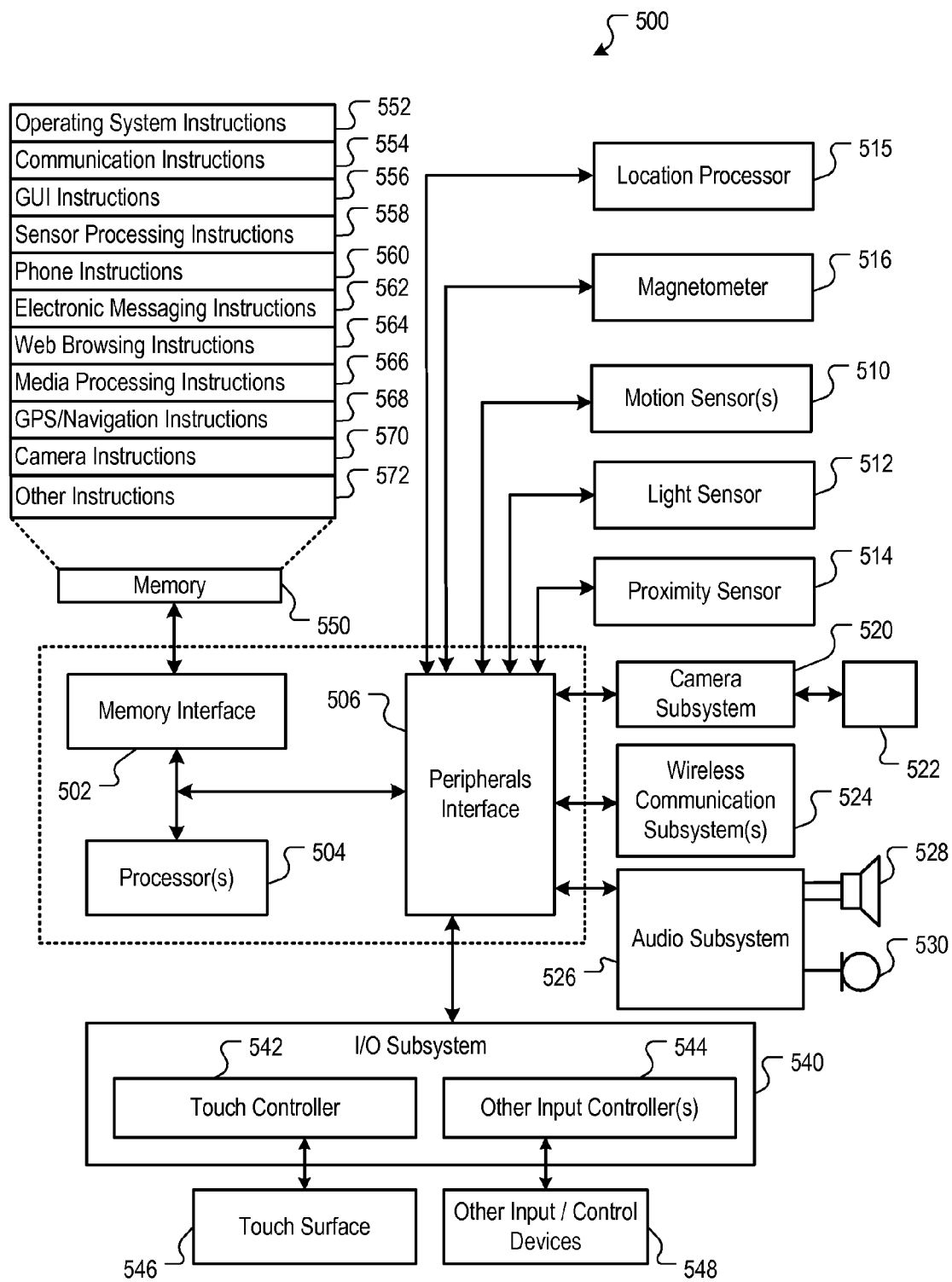
FIG. 5 is a block diagram of example mobile device architecture for implementing the features and processes described in reference to FIGS. 1-4.

FIG. 5 is a block diagram of example mobile device architecture 500 for implementing the features and processes described in reference to FIGS. 1-4. Architecture 500 may be implemented in any mobile device for implementing the features and processes described in reference to FIGS. 1-4, including but not limited to portable computers, smart phones and tablet computers, game consoles, wearable computers and the like. Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor 510, light sensor 512, and proximity sensor 514 may be coupled to peripherals interface 506 to facilitate orientation, lighting, and proximity functions of the device. For example, in some implementations, light sensor 512 may be utilized to facilitate adjusting the brightness of touch surface 546. In some implementations, motion sensor 510 (e.g., an accelerometer, gyros) may be utilized to detect movement and orientation of the device. Accordingly, display objects or media may be presented according to a detected orientation (e.g., portrait or landscape). Other sensors may also be connected to peripherals interface 506, such as a temperature sensor, a biometric sensor, or other sensing device, to facilitate related functionalities.

Location processor 515 (e.g., GPS receiver chip) may be connected to peripherals interface 506 to provide georeferencing. Electronic magnetometer 516 (e.g., an integrated circuit chip) may also be connected to peripherals interface 506 to provide data that may be used to determine the direction of magnetic North. Thus, electronic magnetometer 516 may be used with an electronic compass application.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication subsystem(s) 524 may include one or more wireless communication subsystems. Wireless communication subsystems 524 may include radio frequency receivers and transmitters and/or optical (e.g., infrared) receivers and transmitters. Wired communication systems 524 may include a port, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 524 may depend on the communication network(s) or medium(s) over which the device is intended to operate. For example, a device may include wireless communication subsystems designed to operate using known or standardized protocols, including but not limited to: global system for mobile communications (GSM), GPRS, enhanced data GSM environment (EDGE), IEEE 802.x (e.g., WiFi, WiMax), code division multiple access (CDMA), Near Field Communications (NFC), Bluetooth® (including classic Bluetooth® and Bluetooth® low energy (BLE)). Wireless communication subsystems 524 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known or standardized protocol.

Audio subsystem 526 may be coupled to a speaker 528 and one or more microphones 530 to facilitate voice-enabled functions, such as voice recognition, voice replication, digital recording, and telephony functions.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some implementations, architecture 500 may present recorded audio and/or video files, such as MP3, AAC, and MPEG video files. In some implementations, architecture 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, WINDOWS or an embedded operating system such as VxWorks. Operating system 552 may include instructions for handling basic system services and for performing hardware dependent tasks. In some implementations, operating system 552 may include a kernel (e.g., UNIX kernel).

Memory 550 may also store communication instructions 554 to facilitate communicating with one or more additional devices, one or more computers or servers, including peer-to-peer communications, as described in reference to FIGS. 1-6. Communication instructions 554 may also be used to select an operational mode or communication medium for use by the device, based on a geographic location (obtained by the GPS/Navigation instructions 568) of the device. Memory 550 may include graphical user interface instructions 556 to facilitate graphical user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes; camera instructions 570 to facilitate camera-related processes and functions; and other instructions 572 for performing some or all of the processes, as described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs).

Example Server Architecture

Figure 6:
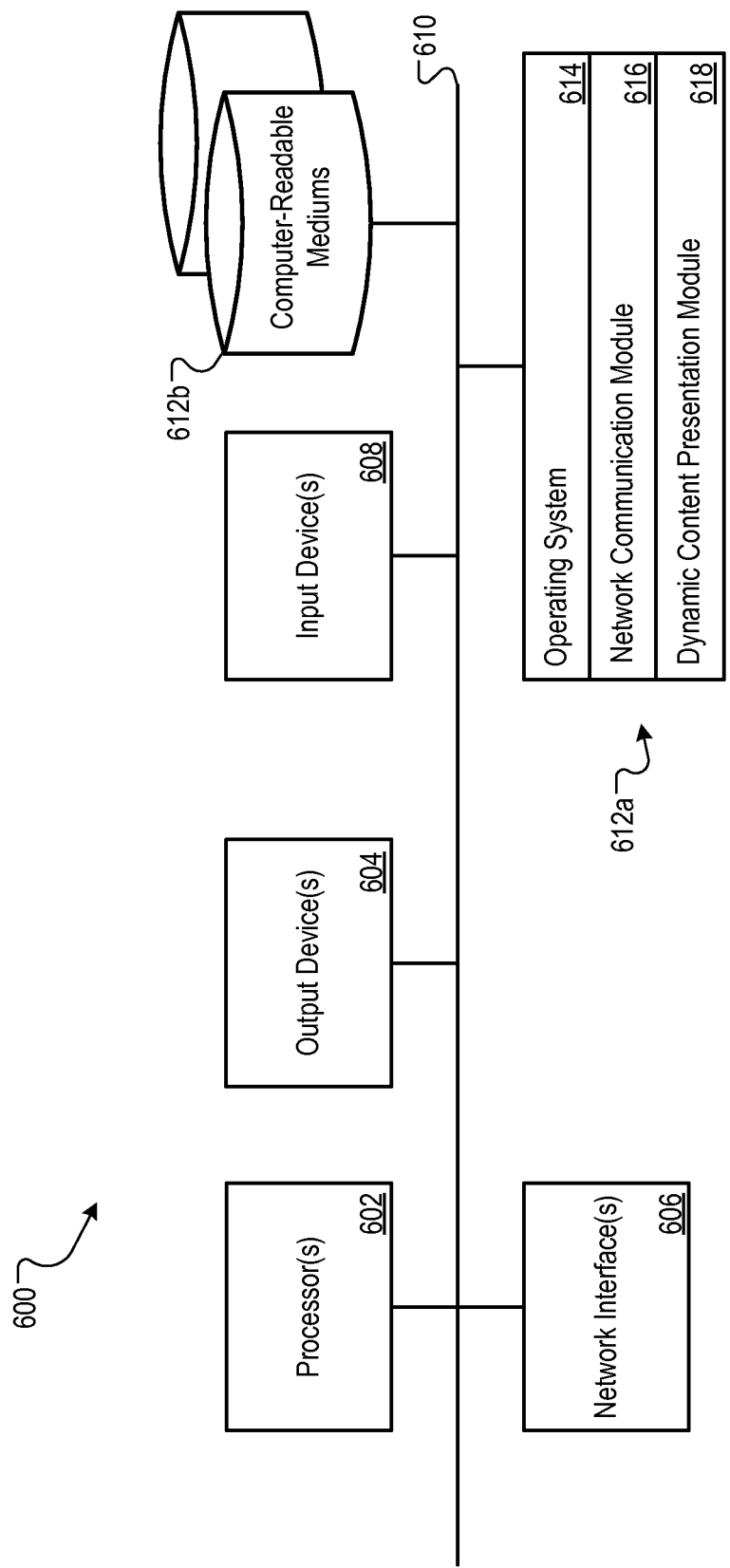
FIG. 6 is a block diagram of example server computer architecture for implementing the features and processes described in reference to FIGS. 1-4.

FIG. 6 is a block diagram of example server computer architecture 600 for implementing the features and processes described in reference to FIGS. 1-4. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more non-transitory computer-readable mediums 612b and memory 612a (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "non-transitory computer-readable medium" refers to any medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable mediums 612b or memory 612a can further include operating system 614 (e.g., Mac OS® server, Windows® NT server), network communication module 616 and dynamic content presentation module 618. Operating system 614 can be multi-user, multiprocessing, multitasking, multithreading, real time, etc. Operating system 614 performs basic tasks, including but not limited to: recognizing input from and providing output to devices 604; keeping track and managing files and directories on storage devices 612b and memory 612a; controlling peripheral devices; and managing traffic on the one or more communication channels 610. Network communications module 616 includes various components for establishing and maintaining network connections (e.g., software for implementing communication protocols, such as TCP/IP, HTTP, etc.). Dynamic content presentation module 618 provides the features and performs the process, described in reference to FIGS. 1-4.

Architecture 600 can be included in any computer device, including one or more server computers each having one or more processing cores. Architecture 600 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, by a wireless interface in a vehicle, two or more user preferences from two or more mobile devices operating in the vehicle;
determining that the two or more mobile devices are present in the vehicle for at least a specified period of time;
responsive to the mobile devices being present in the vehicle for at least the specified period of time:
comparing, by a system in the vehicle, the two or more user preferences to determine a preferred content that is indicated by a percentage of the two or more user preferences;
formatting, by the system, the preferred content for presentation in the vehicle; and
presenting, by an output device in the vehicle, the formatted preferred content.

2. The method of claim 1, wherein the preferred content is a music genre.

3. The method of claim 2, further comprising:
preparing a playlist based on the music genre; and
broadcasting, by the wireless interface, the playlist as the preferred content.

4. The method of claim 1, further comprising:
determining that a particular mobile device is no longer in communication range of the vehicle; and
responsive to the particular mobile device not being in communication range of the vehicle, excluding the particular mobile device from the comparing step.

5. The method of claim 1, wherein at least one of the mobile devices and the output device is the same device.

6. The method of claim 5, further comprising:
receiving a unique identifier from the at least one mobile device; and
formatting at least some of the preferred content for the at least one mobile device; and
broadcasting, by the wireless interface, the at least some formatted preferred content including the unique identifier in the vehicle.

7. The method of claim 1, further comprising:
broadcasting, by the wireless interface, data specifying a language preference for the formatted preferred content.

8. The method of claim 1, further comprising:
broadcasting, by the wireless interface, data specifying an accessibility preference for the formatted preferred content.

9. The method of claim 1, where the formatted preferred content is video data.

10. A system comprising:
a wireless interface;
one or more processors;
memory coupled to the one or more processors and operable to store instructions, which, when executed by the one or more processors, causes the one or more processors to perform operations comprising:
receiving, by the wireless interface, two or more user preferences from two or more mobile devices operating in a vehicle;
determining that the two or more mobile devices are present in the vehicle for at least a specified period of time;
responsive to the mobile devices being present in the vehicle for at least the specified period of time:
comparing, by the one or more processors, the two or more user preferences to determine a preferred content that is indicated by a percentage of the two or more user preferences;
formatting, by the one or more processors, the preferred content for presentation in the vehicle; and
presenting, by an output device in the vehicle, the formatted preferred content.

11. The system of claim 10, wherein the preferred content is a music genre.

12. The system of claim 11, further comprising:
preparing a playlist based on the music genre; and
broadcasting, by the wireless interface, the playlist as the preferred content.

13. The system of claim 10, wherein the one or more operations further comprise:
determining that a particular mobile device is no longer in communication range of the vehicle; and responsive to the particular mobile device not being in communication range of the vehicle, excluding the particular mobile device from the comparing step.

14. The system of claim 10, wherein at least one of the mobile devices and the output device is the same device.

15. The system of claim 14, wherein the one or more operations further comprise:
receiving a unique identifier from the at least one mobile device; and
formatting at least some of the preferred content for the at least one mobile device; and
broadcasting, by the wireless interface, the at least some formatted preferred content including the unique identifier in the vehicle.

16. The system of claim 10, further comprising:
broadcasting, by the wireless interface, data specifying a language preference for the formatted preferred content.

17. The system of claim 10, further comprising:
broadcasting, by the wireless interface, data specifying an accessibility preference for the formatted preferred content.

18. The system of claim 10, where the formatted preferred content is video data.

19. A non-transitory, computer-readable storage medium having instructions stored thereon, which, when executed by one or more processors, causes the one or more processor to perform operations comprising:
receiving, by a wireless interface of a vehicle, two or more user preferences from two or more mobile devices operating in the vehicle;
determining that the two or more mobile devices are present in the vehicle for at least a specified period of time;
responsive to the mobile devices being present in the vehicle for at least the specified period of time:
comparing, by the one or more processors, the two or more user preferences to determine a preferred content that is indicated by a percentage of the two or more user preferences;
formatting, by the one or more processors, the preferred content for presentation in the vehicle; and
presenting, by an output device in the vehicle, the formatted content.

20. The non-transitory, computer-readable storage medium of claim 19, wherein the one or more operations further comprise:
receiving a unique identifier from the at least one mobile device; and
formatting at least some of the preferred content for the at least one mobile device; and
broadcasting, by the wireless interface, the at least some formatted preferred content including the unique identifier in the vehicle.

* * * * *